(12) United States Patent
Kim et al.

(10) Patent No.: US 12,311,882 B2
(45) Date of Patent: *May 27, 2025

(54) VEHICLE AND CONTROL METHOD THEREOF

(71) Applicants: Hyundai Motor Company, Seoul (KR); Kia Corporation, Seoul (KR)

(72) Inventors: Hyunsang Kim, Hwaseong-si (KR); Yun Sup Ann, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 169 days.

This patent is subject to a terminal disclaimer.

(21) Appl. No.: 17/992,138

(22) Filed: Nov. 22, 2022

(65) Prior Publication Data

US 2023/0256939 A1    Aug. 17, 2023

(30) Foreign Application Priority Data

Feb. 11, 2022    (KR) .................... 10-2022-0018211

(51) Int. Cl.
  *B60R 25/25*    (2013.01)
  *B60R 25/30*    (2013.01)
  *G06V 40/16*    (2022.01)
  *G06V 40/18*    (2022.01)

(52) U.S. Cl.
  CPC .......... *B60R 25/255* (2013.01); *B60R 25/305* (2013.01); *G06V 40/16* (2022.01); *G06V 40/18* (2022.01)

(58) Field of Classification Search
  CPC ........ G06V 40/16; G06V 40/18; G06V 40/70; G06V 40/173; G06V 40/167
  See application file for complete search history.

(56) References Cited

U.S. PATENT DOCUMENTS

| | | | |
|---|---|---|---|
| 2018/0032815 A1* | 2/2018 | Lee ...................... | G06V 40/193 |
| 2018/0276465 A1* | 9/2018 | Lee ...................... | G06V 40/197 |
| 2019/0026576 A1* | 1/2019 | Zhang .................... | G06V 40/19 |
| 2019/0087937 A1* | 3/2019 | Saito .......................... | G06T 7/30 |
| 2020/0151433 A1 | 5/2020 | Kim et al. | |
| 2021/0009080 A1 | 1/2021 | Hu et al. | |
| 2021/0061224 A1 | 3/2021 | Kim et al. | |
| 2022/0189205 A1* | 6/2022 | Shibata .................. | G06V 40/19 |

FOREIGN PATENT DOCUMENTS

| | | |
|---|---|---|
| JP | 2006031282 A | 2/2006 |
| JP | 2007199840 A | 8/2007 |
| KR | 20170067226 A | 6/2017 |
| KR | 20200130211 A | 11/2020 |

\* cited by examiner

*Primary Examiner* — Mirza F Alam
(74) *Attorney, Agent, or Firm* — Slater Matsil, LLP

(57) ABSTRACT

An embodiment vehicle includes a camera and a controller configured to determine a distance between the camera and a face of an object based on a face image acquired by the camera, perform an iris authentication based on the distance being shorter than a preset distance, and perform a face authentication based on the distance being greater than the preset distance.

18 Claims, 8 Drawing Sheets

VEHICLE AND CONTROL METHOD THEREOF

CROSS-REFERENCE TO RELATED APPLICATIONS

This application claims the benefit of Korean Patent Application No. 10-2022-0018211, filed on Feb. 11, 2022, which application is hereby incorporated herein by reference.

TECHNICAL FIELD

The disclosure relates to a vehicle and a control method thereof.

BACKGROUND

Face authentication technology, which is one of the biometric authentication technologies, is an authentication technology of determining whether a user is a valid user based on a user's face.

Also, iris authentication technology, which is one of the biometric authentication technologies, is an authentication technology of determining whether a user is a valid user based on a user's iris displayed in a still image or moving image.

Recently, the face authentication technology and the iris authentication technology are widely used in various application fields such as security systems, mobile authentication systems, and vehicle access and starting systems, due to the convenience and efficiency of face authentication technology and iris authentication technology.

However, a user is required to maintain an appropriate distance from a camera so that the eyes, nose and mouth of the user are all exposed for face authentication, and keep a close distance to a camera to accurately expose an iris pattern for iris authentication.

SUMMARY

The disclosure relates to a vehicle and a control method thereof. Particular embodiments relate to a vehicle and a control method thereof that may selectively utilize a face authentication and an iris authentication.

An embodiment of the disclosure provides a vehicle and a control method that may flexibly cope with a change in a user's appearance and surrounding environment by selectively utilizing a face authentication and an iris authentication.

Additional embodiments of the disclosure will be set forth in part in the description which follows and, in part, will be obvious from the description, or may be learned by practice of the disclosure.

According to an embodiment of the disclosure, there is provided a vehicle that includes a camera configured to acquire a face image of an object and a controller configured to perform at least one of a face authentication or an iris authentication based on the face image, wherein the controller is configured to determine a distance between the camera and a face of the object based on the face image, perform the iris authentication based on the distance being shorter than a preset distance, and perform the face authentication based on the distance being greater than the preset distance.

Also, the controller is configured to identify positions of eyes of the object in the face image, and to control the camera to zoom in on the positions of the eyes of the object to perform the iris authentication.

Also, the vehicle further includes a user interface, and the controller is configured to control the user interface to provide at least one of a visual feedback or an audible feedback for guiding the face of the object to approach the camera based on a failure of the face authentication, and to perform the iris authentication after providing at least one of the visual feedback or the audible feedback.

Also, the controller is configured to, based on a similarity score between a reference face image and the face image which causes the failure of the face authentication being greater than or equal to a preset score, and the iris authentication being successful, store the face image which causes the failure of the face authentication as one of the reference face images which is a determination criterion for the face authentication.

Also, the vehicle further includes at least one distance sensor configured to have a detection direction corresponding to a field of view of the camera, and the controller is configured to perform the iris authentication based on a distance to an obstacle measured through the at least one distance sensor being less than or equal to a reference distance.

Also, the controller is configured to detect eyes, a nose and a mouth of the object based on the face image, and perform the iris authentication, based on the eyes of the object being detected from the face image and at least one of the nose or the mouth of the object not being detected from the face image.

Also, the controller is configured to determine whether the object is wearing a mask based on the face image and perform the iris authentication based on a determination that the object is wearing the mask.

Also, the controller is configured to determine the distance between the camera and the face of the object based on sizes of the face or eyes of the object detected from the face image.

Also, the vehicle further includes a contact sensor provided on a door handle, and the controller is configured to wake up the camera based on a contact detected by the contact sensor.

Also, the controller is configured to unlock a door based on the face authentication or the iris authentication being successful.

According to an embodiment of the disclosure, there is provided a control method of a vehicle, the control method including acquiring a face image of an object through a camera and performing at least one of a face authentication or an iris authentication based on the face image, wherein the performing of the face authentication or the iris authentication includes determining a distance between the camera and a face of the object based on the face image, performing the iris authentication based on the distance being shorter than a preset distance, and performing the face authentication based on the distance being greater than the preset distance.

Also, the performing of the iris authentication includes identifying positions of eyes of the object in the face image and performing the iris authentication after controlling the camera to zoom in on the positions of the eyes of the object.

Also, the control method further includes providing at least one of a visual feedback or an audible feedback for guiding the face of the object to approach the camera based on a failure of the face authentication and performing the iris authentication after providing at least one of the visual feedback or the audible feedback.

Also, the control method further includes, based on a similarity score between a reference face image and the face image which causes the failure of the face authentication being greater than or equal to a preset score and the iris authentication being successful, storing the face image which causes the failure of the face authentication as one of the reference face images which is a determination criterion for the face authentication.

Also, the performing of the face authentication or the iris authentication includes performing the iris authentication based on a distance to an obstacle measured through at least one distance sensor, which is configured to have a detection direction corresponding to a field of view of the camera, being less than or equal to a reference distance.

Also, the performing of the face authentication or the iris authentication includes detecting eyes, a nose and a mouth of the object based on the face image and performing the iris authentication, based on the eyes of the object being detected from the face image and at least one of the nose or the mouth of the object not being detected from the face image.

Also, the performing of the face authentication or the iris authentication includes determining whether the object is wearing a mask based on the face image and performing the iris authentication based on a determination that the object is wearing the mask.

Also, the determining of the distance between the camera and the face of the object includes determining the distance between the camera and the face of the object based on sizes of the face or eyes of the object detected from the face image.

Also, the control method further includes waking up the camera based on a contact detected by a contact sensor provided on a door handle.

Also, the control method further includes unlocking a door based on the face authentication or the iris authentication being successful.

BRIEF DESCRIPTION OF THE DRAWINGS

These and/or other embodiments of the disclosure will become apparent and more readily appreciated from the following description of exemplary embodiments, taken in conjunction with the accompanying drawings, in which.

DETAILED DESCRIPTION OF ILLUSTRATIVE EMBODIMENTS

Figure 1:
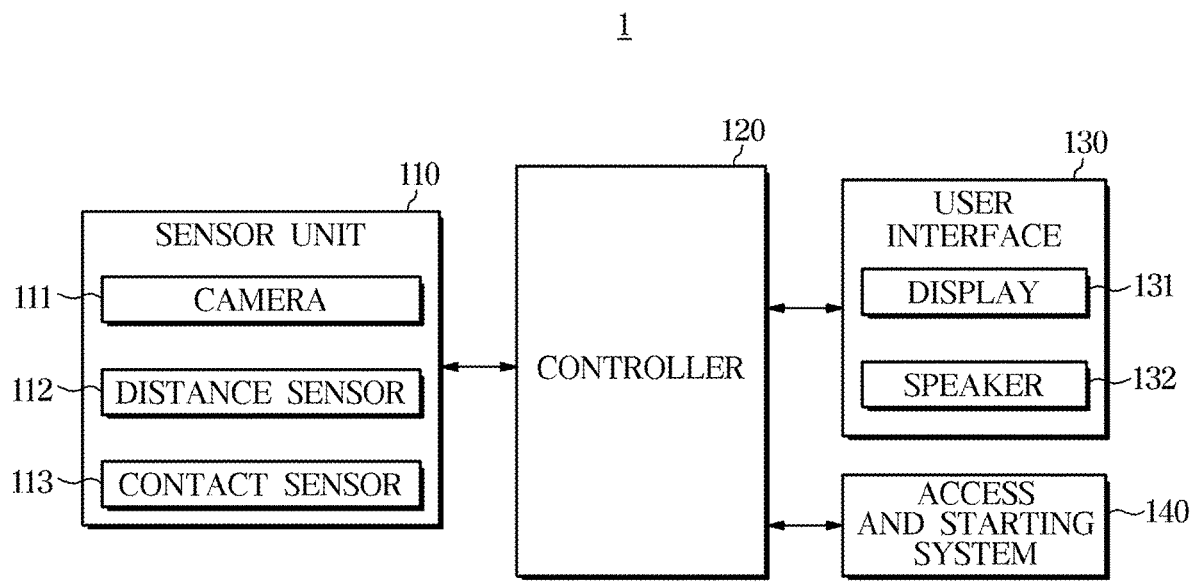
FIG. 1 is a block diagram illustrating a configuration of a vehicle according to an embodiment.

Advantages and features of embodiments and methods of achieving the same will be clearly understood with reference to the accompanying drawings and the following detailed embodiments. However, the present inventive concept is not limited to embodiments described herein, but may be implemented in various different forms. Embodiments are provided in order to explain the present inventive concept for those skilled in the art. The scope of the present inventive concept is defined by the appended claims.

The terms used herein will be briefly described and embodiments will be described in detail.

Although the terms used herein are selected from among general terms that are currently and widely used in consideration of functions in embodiments, these may be changed according to intentions or customs of those skilled in the art or the advent of new technology. In addition, in a specific case, some terms may be arbitrarily selected by applicants. In this case, meanings thereof will be described in a corresponding description of embodiments. Therefore, the meanings of terms used herein should be interpreted based on substantial meanings of the terms and content of this entire specification, rather than simply the terms themselves.

Throughout this specification, when a certain part "includes" a certain component, it means that another component may be further included not excluding another component unless otherwise defined. Moreover, terms described in the specification such as "part" refer to a unit of processing at least one function or operation and may be implemented by software, a hardware component such as a field-programmable gate array (FPGA) or an application-specific integrated circuit (ASIC), or a combination of software and hardware. However, the term "part" is not limited to software or hardware. "Part" may be configured in a recording medium that may be addressed or may be configured to be reproduced on at least one processor. Therefore, examples of the term "part" includes software components, object-oriented software components, components such as class components and task components, processes, functions, properties, procedures, subroutines, segments in program codes, drivers, firmware, microcode, circuits, data, databases, data structures, tables, arrays, and variables. The components and the modules may be provided into a smaller number of components and modules such that the respective component and modules may be merged in respect to the functionality.

Hereinafter, embodiments of a vehicle 1 and a control method of the vehicle 1 will be described in detail with reference to the accompanying drawings. In addition, parts irrelevant to the description are omitted in the drawings in order to clearly explain embodiments. In the accompanying drawings, parts that are identical or equivalent to each other will be given the same reference numerals, and in the following description of the embodiments, details of redundant descriptions thereof will be omitted.

Figure 2:
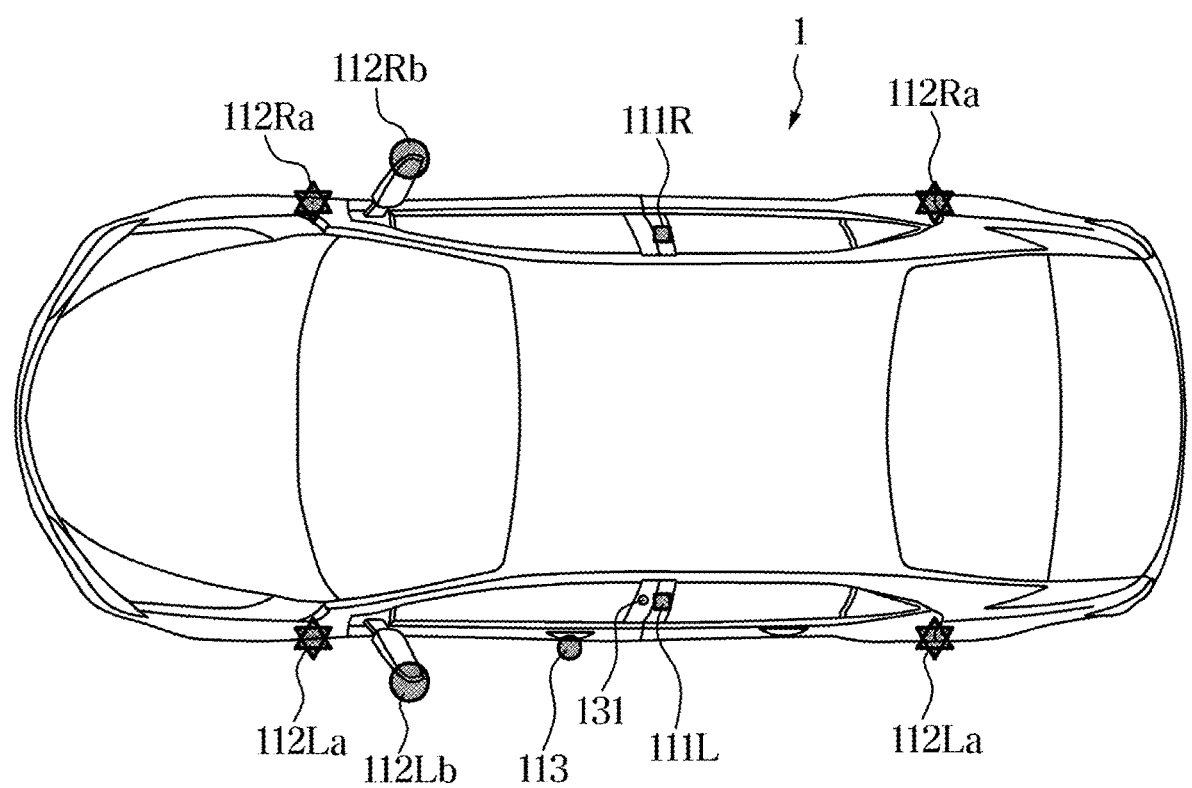
FIG. 2 illustrates an exterior of a vehicle according to an embodiment.

FIG. 1 is a block diagram illustrating a configuration of a vehicle according to an embodiment. FIG. 2 illustrates an exterior of a vehicle according to an embodiment.

Referring to FIGS. 1 and 2, the vehicle 1 may include a sensor unit 110, a controller 120, a user interface 130, and an access and starting system 140.

The sensor unit 110 may include at least one sensor for obtaining surrounding information of the vehicle 1, information about an inside of the vehicle 1, and information about the vehicle 1 itself.

For example, the sensor unit 110 may include a camera 111 acquiring a face image of an object by photographing a face of the object located outside the vehicle 1, at least one distance sensor 112 detecting a distance to an obstacle around the vehicle 1, and/or a contact sensor 113 provided on a door handle of the vehicle 1.

The camera 111 may be mounted at a location to easily capture the face of the object located around the vehicle 1. For example, the camera 111 may be provided on an A-pillar and/or B-pillar at a driver's seat side to capture the object located outside a door of the vehicle 1, without being limited thereto.

In an embodiment, the camera 111 may include a first camera 111L provided on the driver's seat side and/or a second camera 111R provided on a passenger seat side.

The camera 111 may refer to any configuration capable of acquiring a face image of an object. For example, the camera 111 may employ a complementary metal-oxide semiconductor (CMOS) image sensor or a charge-coupled device (CCD) image sensor.

According to various embodiments, the camera 111 may include a near infrared (IR) camera to perform an iris authentication as well as a face authentication. The near IR camera may include an infrared projector that irradiates infrared rays toward an object and an infrared sensor that detects an infrared signal emitted from the infrared projector reflected back from an object.

Also, the camera 111 may be equipped with a zoom-in function and a zoom-out function. For example, the camera 111 may enlarge a set region of interest.

The camera 111 may operate based on a control signal of the controller 120 and transmit the face image of the object to the controller 120.

Accordingly, the controller 120 may perform the face authentication or the iris authentication based on the face image of the object.

In addition, the camera 111 may zoom in on the set region of interest based on the control signal of the controller 120.

In embodiments of the present specification, the face image of the object refers to an image including a part of the object's face.

The at least one distance sensor 112 may measure a distance to an obstacle located around the vehicle 1. For example, the at least one distance sensor 112 may include at least one ultrasonic sensor 112Ra and 112La and/or at least one camera 112Lb and 112Rb.

The at least one ultrasonic sensor 112Ra and 112La may have a detection area facing an outside of the vehicle 1, detect an obstacle located adjacent to the vehicle 1, and measure a distance to the obstacle by transmitting and receiving ultrasonic waves.

In an embodiment, the at least one ultrasonic sensor 112Ra and 112La may have a detection direction corresponding to a respective field of view (or shooting direction) of the camera 111.

Also, the at least one camera 112Lb and 112Rb may have a field of view corresponding to a respective field of view of the camera 111.

For example, the at least one first ultrasonic sensor 112La provided at the driver's seat side may have a detection direction (e.g., the side of the driver's seat) corresponding to a field of view of the first camera 111L, and the at least one second ultrasonic sensor 112Ra provided at the passenger seat side may have a detection direction (e.g., the side of the passenger seat) corresponding to a field of view of the second camera 111R.

The at least one ultrasonic sensor 112Ra and 112La may be employed as an ultrasonic sensor used for a parking assistance system (PAS) of the vehicle 1, without being limited thereto.

Also, the left camera 112Lb provided on the side of the driver's seat may have a field of view corresponding to the field of view of the first camera 111L, and the right camera 112Rb provided on the side of the passenger seat may have a field of view (e.g., the side of the passenger seat) corresponding to the field of view of the second camera 111R.

For example, the left camera 112Lb and the right camera 112Rb may be provided on a left side mirror and a right side mirror, respectively, without being limited thereto.

The left camera 112Lb and the right camera 112Rb may be employed as a camera used for a surround view monitor (SVM) system of the vehicle 1, without being limited thereto.

The distance sensor 112 may transmit information about the distance to the obstacle around the vehicle 1 to the controller 120.

The contact sensor 113 may be provided on a door handle and employ any sensor capable of detecting a driver's contact with the door handle.

For example, the contact sensor 113 may include a capacitive sensor whose capacitance changes depending on contact and/or a touch sensor.

The controller 120 may include at least one memory storing a program performing the aforementioned operations or operations to be described later and at least one processor implementing a stored program.

When the controller 120 includes a plurality of memories and a plurality of processors, the plurality of memories and the plurality of processors may be integrated into one chip or may be physically separated. In addition, the controller 120 may include an image processor for processing an image acquired from the camera 111.

For example, the controller 120 may compare the face image, acquired through the camera 111, with a reference face image stored in the memory to perform face authentication for authenticating the object.

In an embodiment, the controller 120 may perform image pre-processing on the object's face image. The image pre-processing process may include one or more processes of processing the object's face image to have a form more suitable for face authentication. For example, the image preprocessing process may include a process of removing noise included in the object's face image, a process of increasing the contrast of the object's face image, a deblurring process of removing blur included in the object's face image, a process of removing a background region, a warping process of correcting distortion included in the object's face image, and a process of binarizing the object's face image.

The controller 120 may detect a face region in the object's face image. The controller 120 may detect the face region in the object's face image using, for example, a Haar-based cascade AdaBoost classifier, a neural network-based classifier, a support vector machine, or the like. However, the scope of the embodiments is not limited thereto, and the controller 120 may detect a face region from an object's face image using various face region detection techniques.

The controller 120 may normalize the detected face region. In an embodiment, the controller 120 may detect facial feature points (facial landmarks) in the detected facial region and normalize the facial region based on the detected feature points. The controller 120 may detect facial landmarks in the face region, for example, using active contour model (ACM), active shape model (ASM), active appearance model (AAM), supervised descent method (SDM), a feature-point detection technique based on a neural network, or the like. The facial feature points are feature points for major parts of a face, which are provided to identify, for example, the eyebrows, eyes, nose, lips, chin, ears, or contours of a face. Normalization may include, for example, an image cropping process of extracting a face image representing a face region from the object's face image, a process of matching the positions of feature points detected in the face region to predefined reference positions, and a process of adjusting the size of the extracted face region. As an example, the face image extracted from the object's face image may have a form of a patch image. The controller 120 may match the positions of the feature points to the reference positions by performing affine transformation based on the detected positions of the feature points. Here, the affine transformation serves to map a vector space represented by the positions of the feature points to another vector space.

The controller 120 may compare facial feature points of a user extracted from the object's face image with feature points extracted from the reference face image, to compare the object's face image with the reference face image, and according to a result of the comparison, calculate a similarity score.

The similarity score is a score that quantifies a similarity between the facial feature points of the user extracted from the object's face image and the feature points extracted from the reference face image and may be calculated based on the similarity of the feature points.

The similarity score may increase as the difference between feature values of the facial feature points of the user extracted from the object's face image and feature values of the feature points extracted from the reference face image becomes smaller, and the similarity score may decrease as the difference becomes larger.

The controller 120 may employ various algorithms to calculate the similarity score between the object's face image and the reference face image. For example, the controller 120 may execute an algorithm for comparing the feature values of the facial feature points of the user extracted from the object's face image with the feature values of the feature points extracted from the reference face image.

According to various embodiments, the controller 120 may calculate the similarity score between the object's face image and the reference face image using a learning model trained by machine learning.

The controller 120 may determine that the face authentication is successful, based on the similarity score between the object's face image and the reference face image being greater than or equal to a preset threshold value, and determine that the face authentication fails based on the similarity score being less than the preset threshold value.

As such, the controller 120 calculates the similarity score by comparing the facial feature points (e.g., eyes, nose, mouth, etc.) included in the object's face image with the feature points included in the reference face image. Accordingly, when the object desires to perform face authentication, the object is required to maintain an appropriate distance from the camera 111 so that all of the facial feature points are included.

As another example, the controller 120 may acquire iris information of the object from the object's face image obtained through the camera 111 and compare the acquired iris information with reference iris information stored in a memory, thereby performing iris authentication for authenticating the object.

To this end, the controller 120 may identify eyes of the object in the object's face image and compare the iris information extracted from an iris region in an eye region with the reference iris information pre-stored in the memory. Also, when a similarity between the iris information generated from the iris region and the pre-stored reference iris information is greater than or equal to a threshold value, the controller 120 may determine that the iris authentication is successful.

By contrast, when the similarity between the iris information generated from the iris region and the pre-stored reference iris information is less than the threshold value, the controller 120 may determine that the iris authentication fails.

In this instance, the threshold value for similarity refers to a reference value for determining whether the iris authentication is successful.

According to various embodiments, the controller 120 may calculate a similarity between the iris information of the object and the reference iris information using a learning model trained by machine learning.

Each of the iris information generated from the iris region and the reference iris information pre-stored in the memory may include iris pattern data representing an iris pattern.

That is, the controller 120 may calculate a similarity between iris data, representing an iris pattern included in the iris information extracted from the iris region of the object's face image, and iris pattern data representing an iris pattern included in the reference iris information pre-stored in the memory.

In order for the controller 120 to generate the iris data from the iris region of the object's face image, a high-definition image for the iris region is required.

Accordingly, when the object desires to perform authentication through iris authentication, the object's eyes are required to be positioned close to the camera 111.

The reference face image serving as a criterion for face authentication and the reference iris information serving as a criterion for iris authentication may be registered by a user of the vehicle 1 in advance.

For example, the user of the vehicle 1 may register the user's iris information and facial information in the memory of the controller 120 through an inputter (e.g., an audio video navigation (AVN) device) provided in the vehicle 1.

The controller 120 may control the user interface 130 and/or the access and starting system 140, based on whether the face authentication is successful and/or whether the iris authentication is successful.

As an example, based on the face authentication being successful, the controller 120 may control the user interface 130 to provide a visual feedback and/or an audible feedback for notifying that the face authentication is successful. Also, based on the face authentication being successful, the controller 120 may control the access and starting system 140 to unlock a door.

The user interface 130 may include a display 131 for providing a visual feedback indicating a result of the face authentication and/or the iris authentication, and/or a speaker 132 for providing an audible feedback indicating a result of the face authentication and/or the iris authentication.

The display 131 may include at least one display. The at least one display may be a light emitting diode (LED) panel, an organic light emitting diode (OLED) panel, a liquid crystal display (LCD) panel, and/or an indicator.

The display 131 may output a visual indication indicating an authentication result of the face authentication and/or the iris authentication. For example, the vehicle 1 may notify the user of a success or failure of the face authentication through illumination of the indicator.

The display 131 may be provided adjacent to the camera 111 to allow the user to intuitively recognize a process of the face authentication and/or the iris authentication.

The speaker 132 may output a sound indicating an authentication result of the face authentication and/or the iris authentication.

The access and starting system 140 may lock/unlock the door or start the vehicle 1 based on an authentication result of the controller 120.

For example, based on the face authentication and/or the iris authentication being successful, the access and starting system 140 may unlock the door, or start the vehicle 1.

The sensor unit 110, the controller 120, the user interface 130, and the access and starting system 140 may communicate with each other through a vehicle communication network. For example, the sensor unit 110, the controller 120, the user interface 130, and the access and starting system 140 may exchange data through Ethernet, media oriented systems transport (MOST), FlexRay, controller area network (CAN), local interconnect network (LIN), and the like.

Although various components of the vehicle 1 have been described above, a new configuration may be added or a described configuration may be omitted within the scope of the conventional technology.

Figure 3:
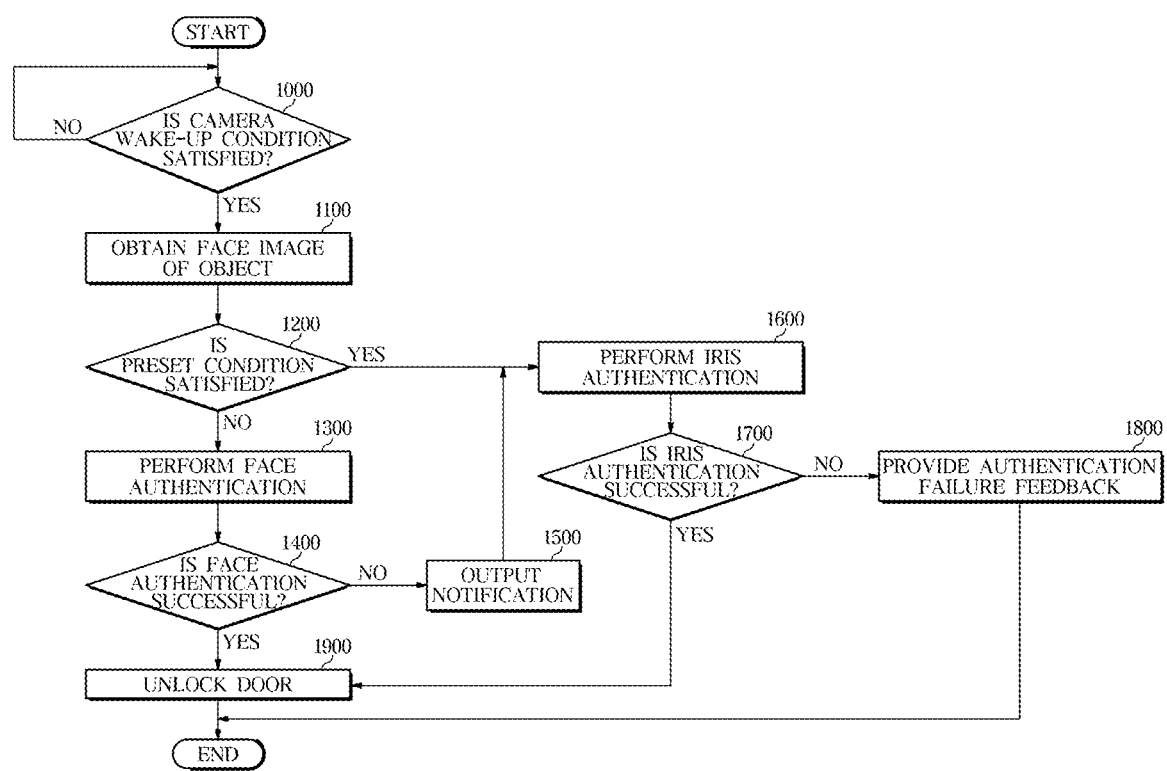
FIG. 3 is a flowchart illustrating a control method of a vehicle according to an embodiment.

FIG. 3 is a flowchart illustrating a control method of a vehicle according to an embodiment.

According to various embodiments, the controller 120 may wake up the camera 111, based on a preset wake-up condition being satisfied (1000).

For example, the controller 120 may wake up the camera 111 based on a contact being detected by the contact sensor 113 provided on a door handle. As another example, the controller 120 may wake up the camera 111 based on an object approaching the vehicle 1 being detected by the distance sensor 112.

However, conditions for waking up the camera 111 are not limited thereto.

In an embodiment, the camera 111 operates only when a wake-up condition is satisfied, thereby reducing power consumption.

The camera 111 may acquire a face image of an object (1100) based on the camera 111 being woken up. For example, the camera 111 may consecutively acquire the object's face image for a preset period of time (e.g., two seconds) and transmit the acquired face image to the controller 120.

The controller 120 may process the face image based on the face image acquired from the camera 111 and determine whether to use a face authentication or an iris authentication based on a result of processing.

That is, the controller 120 may perform the face authentication or the iris authentication based on the object's face image and select an optimal authentication method according to whether a preset condition is satisfied.

For example, the controller 120 may perform the iris authentication as an authentication method (1600) based on the preset condition being satisfied (Yes in operation 1200).

By contrast, the controller 120 may perform the face authentication as an authentication method (1300) based on the preset condition not being satisfied (No in operation 1200).

The preset condition for selecting the authentication method may be stored in the memory of the controller 120 in advance.

As an example, the preset condition may include a condition related to a face image and/or a condition related to an obstacle located next to the vehicle 1.

For instance, the face image-related condition may include a condition related to a distance between the camera 111 and an object's face and/or a condition related to an object's feature points included in the face image.

Also, the condition related to an obstacle located next to the vehicle 1 may include a condition related to a distance between the vehicle 1 and the obstacle.

Figure 4:
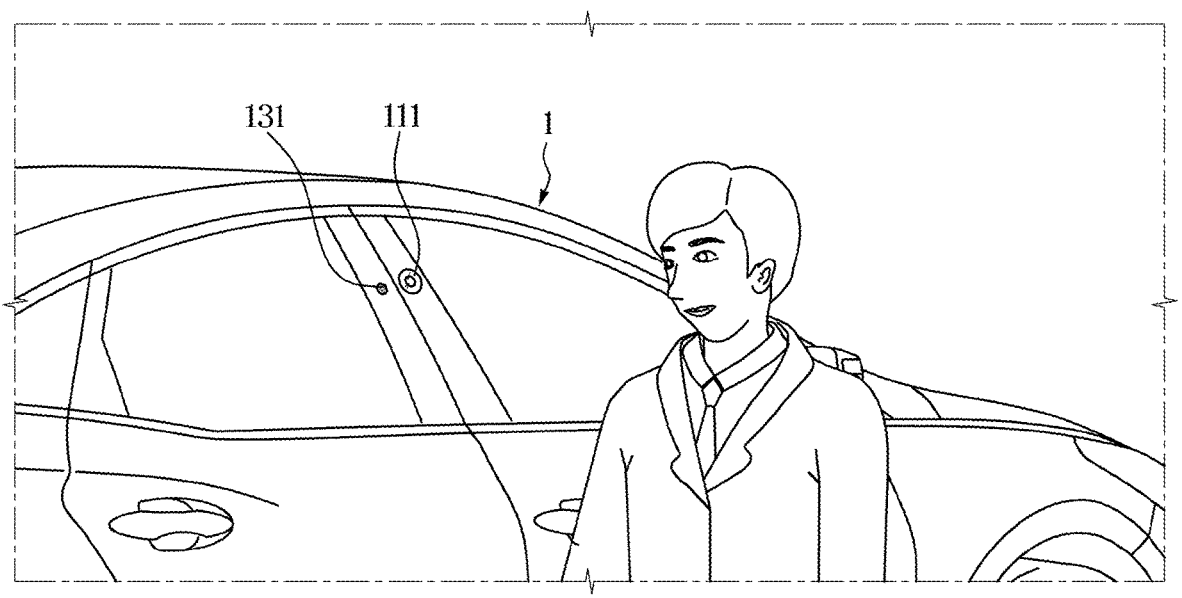
FIG. 4 illustrates a state where a distance between a camera and a face of an object is greater than a preset distance.
Figure 5:
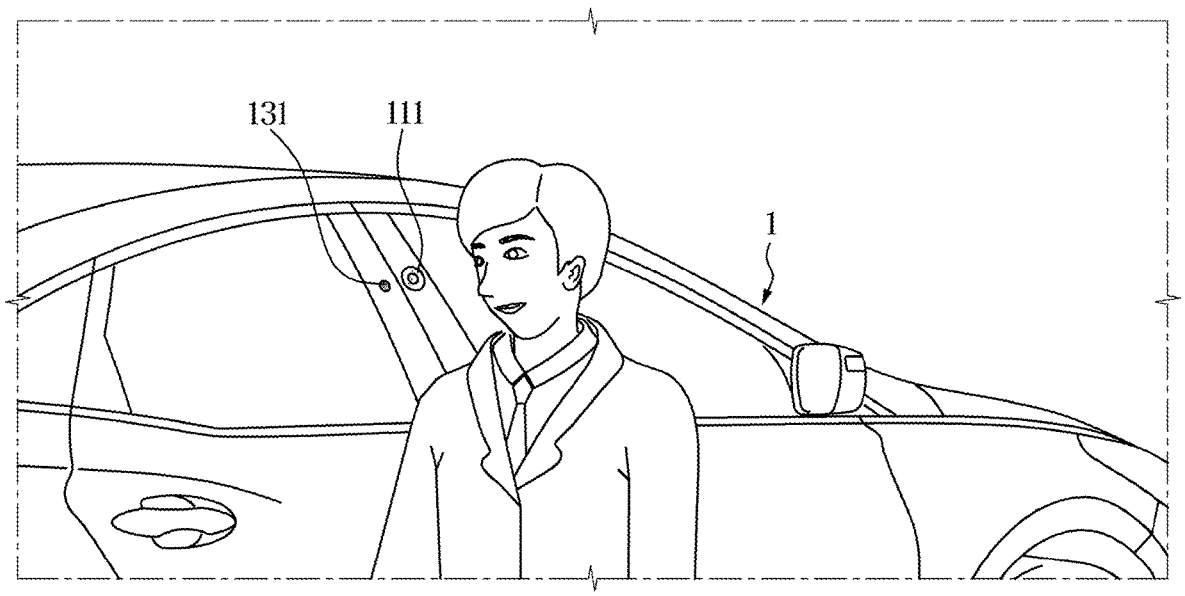
FIG. 5 illustrates a state where a distance between a camera and a face of an object is shorter than a preset distance.

FIG. 4 illustrates a state where a distance between a camera and a face of an object is greater than a preset distance. FIG. 5 illustrates a state where a distance between a camera and a face of an object is shorter than a preset distance.

Referring to FIGS. 4 and 5, in an embodiment, the controller 120 may determine a distance between the camera 111 and a face of an object based on a face image of the object and determine that a preset condition is satisfied based on the distance between the camera 111 and the object's face being shorter than a preset distance.

That is, based on the distance between the camera 111 and the object being shorter than the preset distance (Yes in operation 1200), the controller 120 may perform the iris authentication (1600), and based on the distance between the camera 111 and the object being greater than the preset distance (No in operation 1200), the controller 120 may perform the face authentication (1300).

In this instance, the preset distance may be set to a distance suitable for performing the iris authentication, for example, approximately 20 cm, without being limited thereto.

To this end, the controller 120 may determine the distance between the camera 111 and the object's face based on size of the face or eyes of the object detected from the face image.

As the size of the object's face detected from the face image increases, or as the sizes of the object's eyes increases, it is estimated that the object is closer to the camera 111.

Accordingly, as the size of the object's face and/or the sizes of the object's eyes detected from the face image increases, the controller 120 may determine that the distance between the camera 111 and the object's face is shorter.

Referring to FIG. 4, it may be confirmed that a distance between the camera 111 and an object's face is greater than a preset distance. In this circumstance, a face image of the object acquired from the camera 111 may include all the feature points of the object and the object is highly likely to have an intention to perform identity authentication through face authentication.

Accordingly, the controller 120 may normalize a detected face region and detect facial feature points from the detected face region.

When the facial feature points may be detected from the object's face image, the face authentication may be performed by comparing the facial feature points of the object with feature points extracted from a reference face image.

By contrast, when the distance between the camera 111 and the object's face is rather long, a clear iris pattern may not be obtained from the object's face image.

Accordingly, when the distance between the camera 111 and the object's face is greater than the preset distance, the controller 120 may perform the face authentication rather than the iris authentication.

Based on the face authentication being selected as an authentication method, the controller 120 may control the user interface 130 to output a notification indicating that the face authentication is to be performed.

For example, the controller 120 may control the display 131 to output a visual indication indicating that the face authentication is in progress.

As another example, the controller 120 may control the speaker 132 to output a sound indicating that the face authentication is in progress.

According to embodiments of the disclosure, the object may recognize an authentication method automatically selected by the vehicle and adjust a position of the object's face according to the selected authentication method.

Referring to FIG. 5, it may be confirmed that a distance between the camera 111 and an object's face is shorter than a preset distance. In this circumstance, a face image of the object acquired from the camera 111 may include a portion of feature points of the object and the object is highly likely to have an intention to perform identity authentication through iris authentication.

Accordingly, the controller 120 may neither normalize a detected face region nor detect facial feature points from the detected face region.

When the facial feature points may not be detected from the object's face image, face authentication based on comparison between the facial feature points of the object with feature points extracted from a reference face image may not be performed.

By contrast, when the distance between the camera 111 and the object's face is rather short, a clear iris pattern may be obtained from the object's face image.

Accordingly, when the distance between the camera 111 and the object's face is shorter than the preset distance, the controller 120 may perform the iris authentication rather than the face authentication.

Based on the iris authentication being selected as an authentication method, the controller 120 may control the user interface 130 to output a notification indicating that the iris authentication is to be performed.

For example, the controller 120 may control the display 131 to output a visual indication indicating that the iris authentication is in progress. In this instance, the visual indication indicating that the iris authentication is in progress may be different from the visual indication indicating that the face authentication is in progress.

As another example, the controller 120 may control the speaker 132 to output a sound indicating that the iris authentication is in progress. In this instance, the sound indicating that the iris authentication is in progress may be different from the sound indicating that the face authentication is in progress.

According to embodiments of the disclosure, the object may recognize an authentication method automatically selected by the vehicle and adjust a position of the object's face according to the selected authentication method.

Also, according to embodiments of the disclosure, a more suitable authentication method may be selected from the face authentication and the iris authentication according to the distance between the camera and the object's face, thereby improving user convenience as well as an authentication rate.

Figure 6:
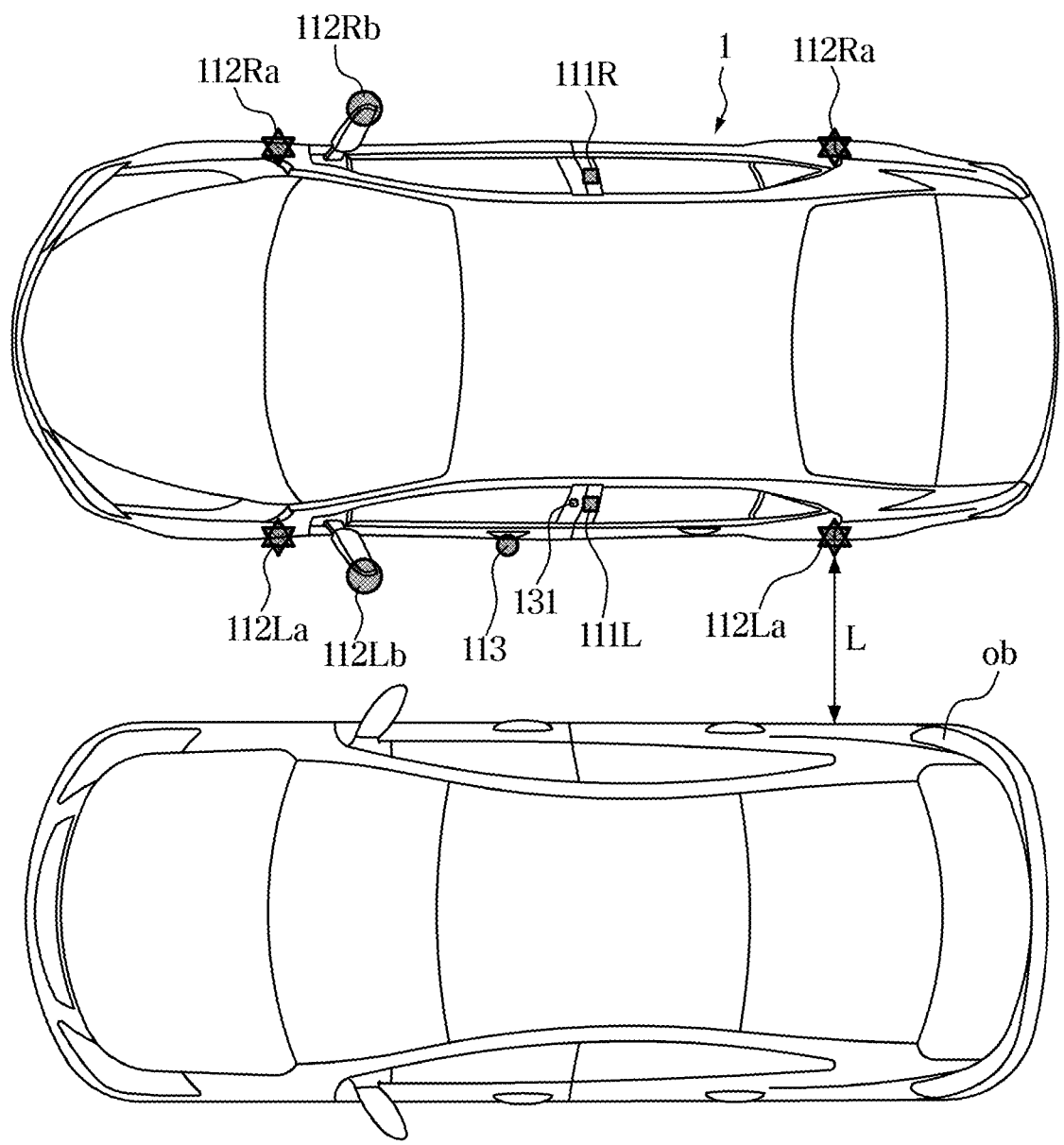
FIG. 6 illustrates a state where an obstacle is present next to a vehicle according to an embodiment.

FIG. 6 illustrates a state where an obstacle is present next to a vehicle according to an embodiment.

Referring to FIG. 6, in an embodiment, the controller 120 may detect a distance to an obstacle through at least one distance sensor having a detection direction corresponding to a field of view of the camera 111 that acquires a face image of an object.

For example, when an object's face image is acquired through the first camera 111L, the at least one distance sensor 112 having a detection direction corresponding to a field of view of the first camera 111L may include at least one first ultrasonic sensor 112La and/or the left camera 112Lb.

In an embodiment, the controller 120 may determine that a preset condition is satisfied based on a distance L to an obstacle ob measured through the distance sensor 112 being less than or equal to a reference distance.

That is, based on the distance L to the obstacle ob measured through the distance sensor 112 being less than or equal to the reference distance (Yes in operation 1200), the controller 120 may perform the iris authentication (1600). In this instance, the reference distance may be set to a distance at which the object's face is hardly far away from the camera 111, for example, approximately 80 cm, without being limited thereto.

When the obstacle ob is closely located next to the vehicle 1, a user may neither walk between the obstacle ob and the vehicle 1 nor maintain a distance between the camera 111 and the user's face.

In this instance, the obstacle ob may refer to a fixed obstacle such as a wall, column, or another vehicle.

Accordingly, the user is highly likely to have an intention to use the iris authentication requiring exposure of eyes only, rather than the face authentication requiring exposure of an entire face.

According to embodiments of the disclosure, the iris authentication may be selected when the distance to the obstacle measured through the distance sensor is less than or equal to the reference distance, thereby improving user convenience.

Figure 7:
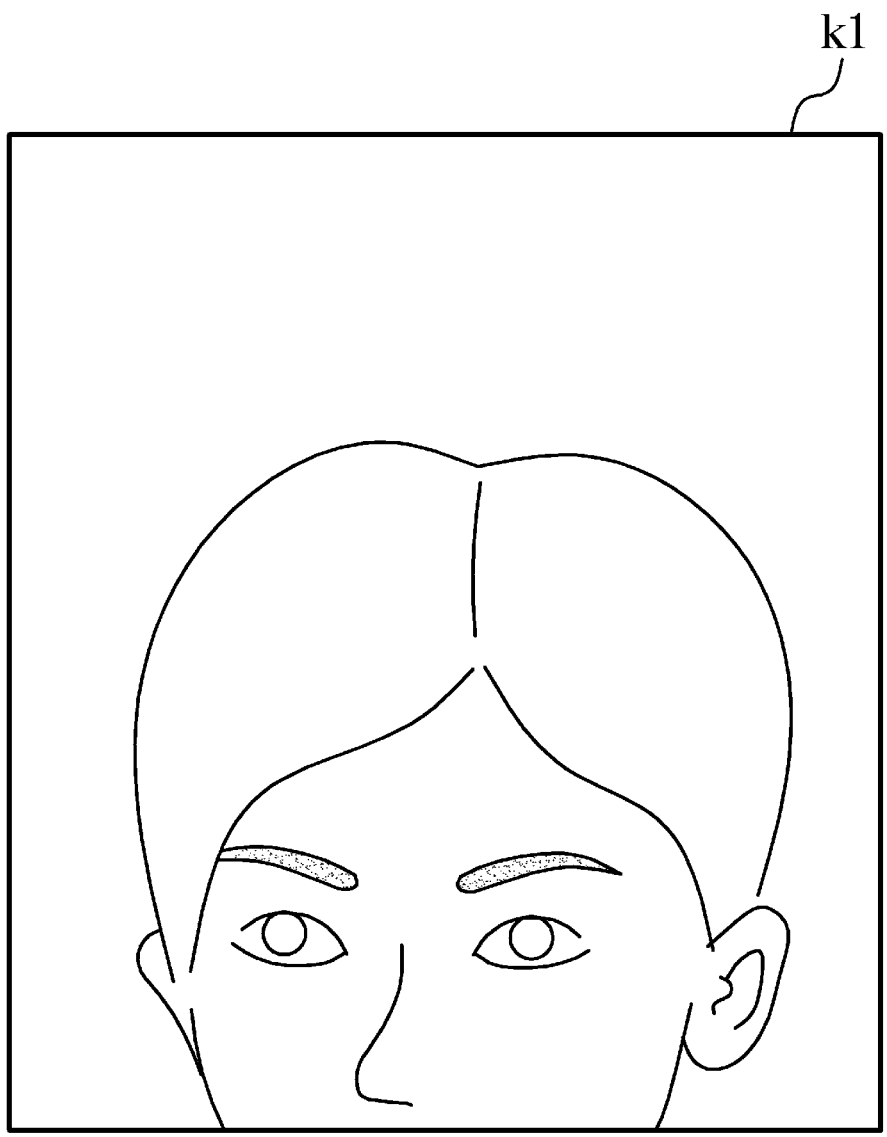
FIG. 7 illustrates an example of an object's face image obtained by a camera according to an embodiment.
Figure 8:
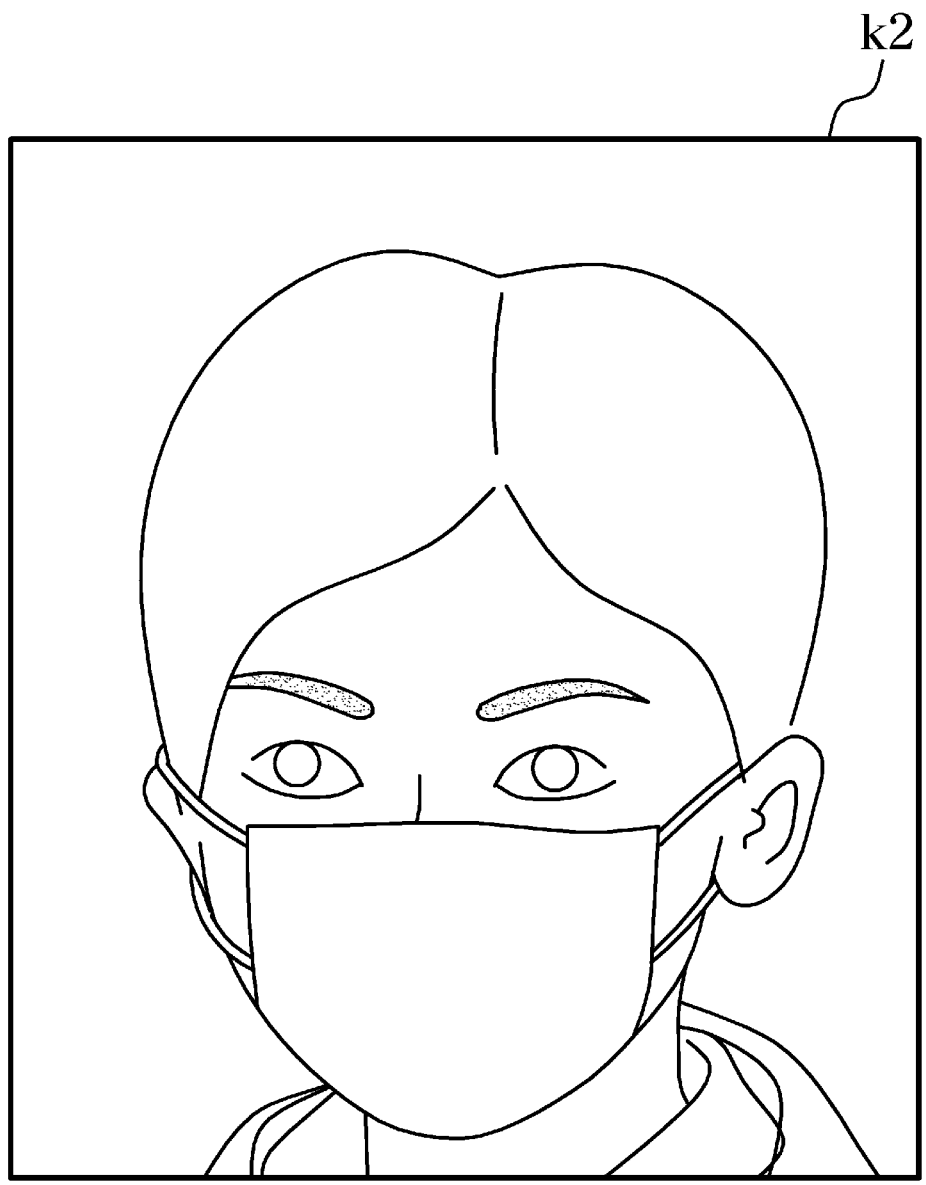
FIG. 8 illustrates another example of an object's face image obtained by a camera according to an embodiment.

FIG. 7 illustrates an example of an object's face image obtained by a camera according to an embodiment. FIG. 8 illustrates another example of an object's face image obtained by a camera according to an embodiment.

Referring to FIGS. 7 and 8, in an embodiment, the controller 120 may detect eyes, a noise and a mouth of an object based on a face image of the object and determine that a preset condition is satisfied based on the object's eyes being detected and based on at least one of the object's nose or mouth not being detected from the face image.

That is, based on the object's eyes being detected and based on the at least one of the object's nose or mouth not being detected from the face image (Yes in operation 1200), the controller 120 may perform the iris authentication (1600). Also, based on all of the object's eyes, nose and mouth being detected from the face image (No in operation 1200), the controller 120 may perform the face authentication (1300).

According to various embodiments, the controller 120 may determine whether the object is wearing a mask based on the face image and perform the iris authentication (1600) based on a determination that the object is wearing a mask (Yes in operation 1200).

Referring to FIG. 7, it may be confirmed that the object's eyes and nose but not the object's mouth are detected from an object's face image k1.

Accordingly, when the face authentication is performed based on the face image k1 shown in FIG. 7, an authentication rate may be significantly low.

Thus, the controller 120 may perform the iris authentication, based on the object's eyes and nose being detected from the face image k1 and the object's mouth not being detected.

Referring to FIG. 8, it may be confirmed that a mask is detected from an object's face image k2.

Accordingly, when the face authentication is performed based on the face image k2 shown in FIG. 8, an authentication rate may be significantly low.

Thus, the controller 120 may perform the iris authentication based on a determination that the object detected from the object's face image k2 is wearing a mask.

In an embodiment, when the iris authentication is selected as an authentication method, the controller 120 may determine positions of the object's eyes in the face image and perform the iris authentication after controlling the camera 111 to zoom in on the positions of the object's eyes (1600).

However, when the iris authentication is selected based on the distance between the camera 111 and the object's face being shorter than the preset distance, because the camera 111 captures the object's eyes within a sufficiently close distance, even without using a zoom-in function of the camera 111, a clear iris pattern may be secured.

Thus, according to various embodiments, the controller 120 may perform the iris authentication after controlling the camera 111 to zoom in on the positions of the object's eyes, when performing the iris authentication based on a distance L to an obstacle ob measured through the distance sensor 112 being less than or equal to a reference distance, and/or when performing the iris authentication based on the object's eyes being detected and at least one of the object's nose or mouth not being detected, and/or when performing the iris authentication based on a determination that the object detected from the face image is wearing a mask.

According to embodiments of the disclosure, by using the zoom-in function of the camera 111, an enlarged eye image of the object may be obtained, and thus a clear iris pattern may be acquired and an authentication rate may be improved.

In an embodiment, when the iris authentication is selected as an authentication method, the controller 120 may control the user interface 130 to provide a visual feedback or an audible feedback so that the object's face approaches the camera 111 and perform the iris authentication after providing the visual feedback or the audible feedback (1600).

However, when the iris authentication is selected as an authentication method based on the distance between the camera 111 and the object's face being shorter than the preset distance, because the camera 111 captures the object's eyes within a sufficiently close distance, even without providing a guide to approach the camera 111, a clear iris pattern may be secured.

Thus, the controller 120 may perform the iris authentication after controlling the user interface 130 to provide the visual feedback or the audible feedback so that the object's face approaches the camera 111, when performing the iris authentication based on a distance L to an obstacle ob measured through the distance sensor 112 being less than or equal to a reference distance, and/or when performing the iris authentication based on the object's eyes being detected and at least one of the object's nose or mouth not being detected, and/or when performing the iris authentication based on a determination that the object detected from the face image is wearing a mask.

According to various embodiments, the controller 120 may control the user interface 130 to provide the visual feedback or the audible feedback so that the object's face approaches the camera 111 based on the sizes of the object's eyes detected from the face image being less than or equal to a preset size.

Referring again to FIG. 3, as described above, the controller 120 may perform the face authentication (1300) based on the preset condition not being satisfied (No in operation 1200).

Specifically, the controller 120 may determine that the face authentication is successful, based on a similarity score between the object's face image and a reference face image being greater than or equal to a preset threshold value and determine that the face authentication fails based on the similarity score being less than the preset threshold value.

Based on the face authentication being successful (Yes in operation 1400), the controller 120 may transmit an authentication success message to at least one electronic control unit so that a function of the vehicle 1 related to the authentication success is to be performed.

For example, the controller 120 may control the access and starting system 140 to unlock a door (1900) based on the face authentication being successful (Yes in operation 1400).

By contrast, the controller 120 may change the authentication method to the iris authentication based on the face authentication having failed the preset number of times (No in operation 1400).

To this end, based on the failure of the face authentication (No in operation 1400), the controller 120 may control the user interface 130 to provide a visual feedback or an audible feedback for notifying the failure of face authentication (1500).

In an embodiment, when the authentication method is changed from the face authentication to the iris authentication due to the failure of face authentication, based on the face authentication having failed (No in operation 1400), the controller 120 may control the user interface 130 to provide the visual feedback or the audible feedback so that the object's face approaches the camera 111 (1500).

The controller 120 may perform the iris authentication (1600), after providing the visual feedback or the audible feedback so that the object's face approaches the camera 111.

According to embodiments of the disclosure, when the face authentication fails, the authentication method may be automatically changed to the iris authentication, instead of still employing the face authentication showing a low authentication rate, thereby improving user convenience.

According to various embodiments, when the similarity score between the object's face image for which the face authentication fails and the reference face image, which is a determination criterion for the face authentication, is greater than or equal to a preset score, the controller 120 may store the object's face image for which the face authentication fails in the memory.

In this instance, the preset score may be set to a value less than a threshold value preset for determining whether the face authentication is successful.

That is, the preset score may be set to a score to the extent that the object is determined as a user having an appearance similar to that of a legitimate user, even though the object is not certainly determined as a legitimate user.

For example, when the similarity score is greater than or equal to 0.8, the controller 120 may determine that the face authentication is successful, and when the similarity score is greater than or equal to 0.7 and less than 0.8, determine that the face authentication fails, and temporarily store the object's face image.

When the preset condition is satisfied (Yes in operation 1200) and/or when the face authentication fails (No in operation 1400), the controller 120 may perform the iris authentication (1600).

As described above, the controller 120 may acquire iris information from the object's face image and authenticate the object by comparing the acquired iris information with the reference iris information stored in the memory.

When a similarity between the iris information of the object and the reference iris information is less than a threshold value (No in operation 1700), the controller 120 may determine that the iris authentication fails.

Based on the failure of the iris authentication (No in operation 1700), the controller 120 may control the user interface 130 to provide a visual feedback or an audible feedback for notifying that the iris authentication fails (1800).

By contrast, based on the iris authentication being successful (Yes in operation 1700), the controller 120 may transmit an authentication success message to at least one electronic control unit so that a function of the vehicle 1 related to the authentication success is to be performed.

For example, the controller 120 may control the access and starting system 140 to unlock a door (1900) based on the iris authentication being successful (Yes in operation 1700).

According to various embodiments, when the authentication method is changed from the face authentication to the iris authentication due to the failure of face authentication (No in operation 1400), the controller 120 may store the object's face image for which the face authentication fails as the reference face image, based on the similarity score between the face image for which the face authentication fails and the reference face image being greater than or equal to the preset score and based on the iris authentication being successful (Yes in operation 1700).

A similarity score between the reference face image and the object's face image, used in the face authentication process performed before the iris authentication is successful, is greater than or equal to the preset score, which indicates that the object is estimated as a user having an appearance similar to that of a legitimate user, despite not being certain as the legitimate user. When the object is authenticated as the legitimate user as a result of the iris authentication performed, it is estimated that the object's face image, used in the face authentication process performed before the iris authentication is successful, is a face image of the legitimate user.

Thus, in an embodiment, when the object's face image for which the face authentication fails is determined as a face image of a legitimate user, the controller 120 may store the object's face image for which the face authentication fails as the reference face image, thereby robustly enhancing an authentication success rate of face authentication despite a change in the user's appearance or environmental conditions around the vehicle 1.

According to embodiments of the disclosure, even when a face authentication fails, an iris authentication may be performed as an auxiliary authentication means, thereby improving user convenience.

Also, according to embodiments of the disclosure, a face authentication or an iris authentication may be selectively utilized depending on a distance between a camera and a user, thereby improving an authentication success rate.

Further, according to embodiments of the disclosure, an object's face image estimated as a legitimate user may be automatically updated to a reference face image, thereby improving a face authentication system to be more robust to changes in the user's appearance.

Meanwhile, a portion of constituent components of the vehicle 1 may be a software component and/or a hardware component, such as a Field Programmable Gate Array (FPGA) and an Application Specific Integrated Circuit (ASIC).

Embodiments can be stored in the form of a recording medium storing computer-executable instructions. The instructions may be stored in the form of a program code, and when executed by a processor, the instructions may perform operations of the disclosed embodiments. The recording medium may be implemented as a computer-readable recording medium.

The computer-readable recording medium includes all kinds of recording media in which instructions which may be decoded by a computer are stored of, for example, a read only memory (ROM), a random access memory (RAM), magnetic tapes, magnetic disks, flash memories, an optical recording medium, and the like.

As is apparent from the above, according to embodiments of the disclosure, authentication can be performed through an iris authentication, even when a face authentication fails due to a change in a user's appearance and surrounding environment.

Also, according to embodiments of the disclosure, a face authentication or an iris authentication can be selectively utilized depending on a distance between a user and a camera, thereby improving an authentication success rate.

Further, according to embodiments of the disclosure, a user can select an appropriate authentication method according to a feedback provided by a vehicle.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A vehicle comprising:
   a camera;
   a user interface; and
   a controller configured to:
   determine a distance between the camera and a face of an object based on a face image acquired by the camera;
   perform an iris authentication based on the distance being shorter than a preset distance;
   perform a face authentication based on the distance being greater than the preset distance;
   wherein the controller is configured to identify positions of eyes of the object in the face image and control the camera to zoom in on the positions of the eyes of the object to perform the iris authentication; and
   wherein, in response to a failure of the face authentication, the controller is configured to control the user interface to provide a visual feedback or an audible feedback for guiding the face of the object to approach the camera and perform the iris authentication after providing the visual feedback or the audible feedback.

2. The vehicle of claim 1, wherein, based on a similarity score between a reference face image and the face image that causes the failure of the face authentication being greater than or equal to a preset score and the iris authentication being successful, the controller is configured to store the face image that causes the failure of the face authentication as an additional reference face image that is a determination criterion for the face authentication.

3. The vehicle of claim 1, further comprising a distance sensor having a detection direction corresponding to a field of view of the camera, wherein the controller is configured to perform the iris authentication based on a distance to an obstacle measured through the distance sensor being less than or equal to a reference distance.

4. The vehicle of claim 1, wherein the controller is configured to detect eyes, a nose, and a mouth of the object based on the face image and perform the iris authentication based on the eyes of the object being detected from the face image and the nose or the mouth of the object not being detected from the face image.

5. The vehicle of claim 1, wherein the controller is configured to determine whether the object is wearing a mask based on the face image and perform the iris authentication based on a determination that the object is wearing the mask.

6. The vehicle of claim 1, wherein the controller is configured to determine the distance between the camera and the face of the object based on sizes of the face or eyes of the object detected from the face image.

7. The vehicle of claim 1, further comprising a contact sensor provided on a door handle, wherein the controller is configured to wake up the camera based on a contact detected by the contact sensor.

8. The vehicle of claim 1, wherein the controller is configured to unlock a door based on the face authentication or the iris authentication being successful.

9. A control method of a vehicle, the control method comprising:
acquiring a face image of an object through a camera; and
performing a face authentication or an iris authentication based on the face image, wherein performing the face authentication or the iris authentication comprises:
determining a distance between the camera and a face of the object based on the face image;
performing the iris authentication based on the distance being shorter than a preset distance;
performing the face authentication based on the distance being greater than the preset distance;
providing a visual feedback or an audible feedback for guiding the face of the object to approach the camera based on a failure of the face authentication; and
performing the iris authentication after providing the visual feedback or the audible feedback, wherein performing the iris authentication comprises identifying positions of eyes of the object in the face image and performing the iris authentication after controlling the camera to zoom in on the positions of the eyes of the object.

10. The control method of claim 9, further comprising, based on a similarity score between a reference face image and the face image that causes the failure of the face authentication being greater than or equal to a preset score and the iris authentication being successful, storing the face image that causes the failure of the face authentication as an additional reference face image that is a determination criterion for the face authentication.

11. The control method of claim 9, wherein performing the face authentication or the iris authentication comprises performing the iris authentication based on a distance to an obstacle measured through a distance sensor being less than or equal to a reference distance, wherein the distance sensor has a detection direction corresponding to a field of view of the camera.

12. The control method of claim 9, wherein performing the face authentication or the iris authentication comprises:
detecting eyes, a nose, or a mouth of the object based on the face image; and
performing the iris authentication based on the eyes of the object being detected from the face image and the nose or the mouth of the object not being detected from the face image.

13. The control method of claim 9, wherein performing the face authentication or the iris authentication comprises:
determining whether the object is wearing a mask based on the face image; and
performing the iris authentication based on a determination that the object is wearing the mask.

14. The control method of claim 9, wherein determining the distance between the camera and the face of the object comprises determining the distance between the camera and the face of the object based on sizes of the face or eyes of the object detected from the face image.

15. The control method of claim 9, further comprising waking up the camera based on a contact detected by a contact sensor provided on a door handle.

16. The control method of claim 9, further comprising unlocking a door based on the face authentication or the iris authentication being successful.

17. A vehicle comprising:
a camera;
a user interface;
a distance sensor having a detection direction corresponding to a field of view of the camera; and
a controller configured to:
determine a distance between the camera and a face of an object based on a face image acquired by the camera, the distance being determined from the distance sensor;
detect eyes, a nose, and a mouth of the object based on the face image;
perform an iris authentication based on the distance being shorter than a preset distance, the iris authentication being performed based on the eyes of the object being detected from the face image and the nose or the mouth of the object not being detected from the face image; and
perform a face authentication based on the distance being greater than the preset distance;
wherein the controller is configured to identify positions of eyes of the object in the face image and control the camera to zoom in on the positions of the eyes of the object to perform the iris authentication; and
in response to a failure of the face authentication, the controller is configured to control the user interface to provide a visual feedback or an audible feedback for guiding the face of the object to approach the camera and perform the iris authentication after providing the visual feedback or the audible feedback.

18. The vehicle of claim 17, wherein the controller is configured to determine the distance between the camera and the face of the object based on sizes of the face or the eyes.

* * * * *